United States Patent [19]

Alexander, III

[11] E Patent Number: Re. 33,399

[45] Reissued Date of Patent: Oct. 23, 1990

[54] TENSION CONTROL FOR WEB HANDLING APPARATUS

[76] Inventor: William J. Alexander, III, P.O. Box 848, Mauldin, S.C. 29662

[21] Appl. No.: 886,209

[22] Filed: Jul. 16, 1986

Related U.S. Patent Documents

Reissue of:

[64] Patent No.: 4,588,931
Issued: May 13, 1986
Appl. No.: 638,534
Filed: Aug. 6, 1984

U.S. Applications:

[63] Continuation of Ser. No. 454,699, Dec. 30, 1982, abandoned.

[51] Int. Cl.[5] ..... B65H 77/00

[52] U.S. Cl. ..... 318/7; 318/6; 242/62; 242/66; 242/196

[58] Field of Search ..... 318/6, 7, 347; 242/54 R, 55, 62, 66, 67.5, 75, 75.44, 75.45, 75.5, 75.51, 186, 188, 189, 190, 196

[56] References Cited

U.S. PATENT DOCUMENTS

| | | | |
|---|---|---|---|
| 1,455,976 | 5/1923 | Stevens | 242/66 |
| 2,169,016 | 8/1939 | Baker | 318/6 X |
| 2,354,952 | 8/1944 | Hornbostel | 242/66 |
| 2,468,557 | 1/1949 | Huston | 318/6 X |
| 2,890,000 | 6/1959 | Beachler | 242/66 |
| 3,000,584 | 9/1961 | Clem | 242/66 |
| 3,057,572 | 10/1962 | Rockstorm et al. | 242/66 |
| 3,221,237 | 11/1965 | Kalenian | 318/6 |
| 3,450,364 | 6/1969 | Marsh et al. | 242/66 |

*Primary Examiner*—Bentsu Ro
*Attorney, Agent, or Firm*—Bailey & Hardaway

[57] ABSTRACT

A batcher and the like is illustrated for utilizing torque control rather than speed control to vary the packing ratio of the rolls of a surface wound cloth roll. A phase shifting differential transmission is controlled by a condensor in series with the armature of a field wound D.C. motor in a drive between the rolls responsive to cloth tension to maintain such tension substantially constant.

3 Claims, 2 Drawing Sheets

TENSION CONTROL FOR WEB HANDLING APPARATUS

Matter enclosed in heavy brackets [ ] appears in the original patent but forms no part of this reissue specification; matter printed in italics indicates the additions made by reissue.

This application is a continuation of application Ser. No. 454,699, filed Dec. 30, 1982, now abandoned.

BACKGROUND OF THE INVENTION

Heretofore, a two roll take-up or batcher has had a packing ratio between the two bed rolls which was determined by fixed chain drive ratio which would give, a packing ratio of for example, two, two and one-half to three per cent. To vary this packing ratio the chain drive between them had to be changed.

It is proposed that a variable speed mechanism be connected in the power transmission between the two bed rolls with a means of varying the packing ratio responsive to tension in the fabric. This is accomplished by having a torque controlled drive controlling the variable speed mechanism between the two rolls.

SUMMARY OF THE INVENTION

This drive may include a suitable tension controlled drive in conjunction with a field wound direct current motor. Since this is a torque controlled drive means the speed varies proportionally to the load on the motor shaft. The packing ratio thus varies with the connecting drive load (cloth tension) between the two bed rolls which feeds back to the motor and control and changes speed such that the tension in the fabric remains relatively constant. If a control is utilized wherein a capacitor is in series with the armature of the motor, the armature current is limited thereby responsive to cloth tension and the motor is allowed to slow down or stall without overheating.

Winding of fabric using, as a part of the transmission between the two rolls a torque controlled phase shift differential thus controlled responsive to web tension, may be described assuming that a first bed roll is driven at a regulated speed. The second roll of cloth delivery roll is also driven at a regulated speed but with a regulated torque applied to the transmission opposed to the rotation of the roll. This causes a speed difference by virtue of the torque applied responsive to cloth tension. Assuming no slippage between the roll covering of the second roll and the fabric roll, and no stretch in the fabric, the speeds of both rolls would be the same. But with the torque controlled phase shift the second roll will have torque applied opposing its rotation thus resulting in a packing of the roll even with no speed difference. Packing is applied by a pull between the covering material of cloth delivery roll and the fabric roll.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

Figure 1:
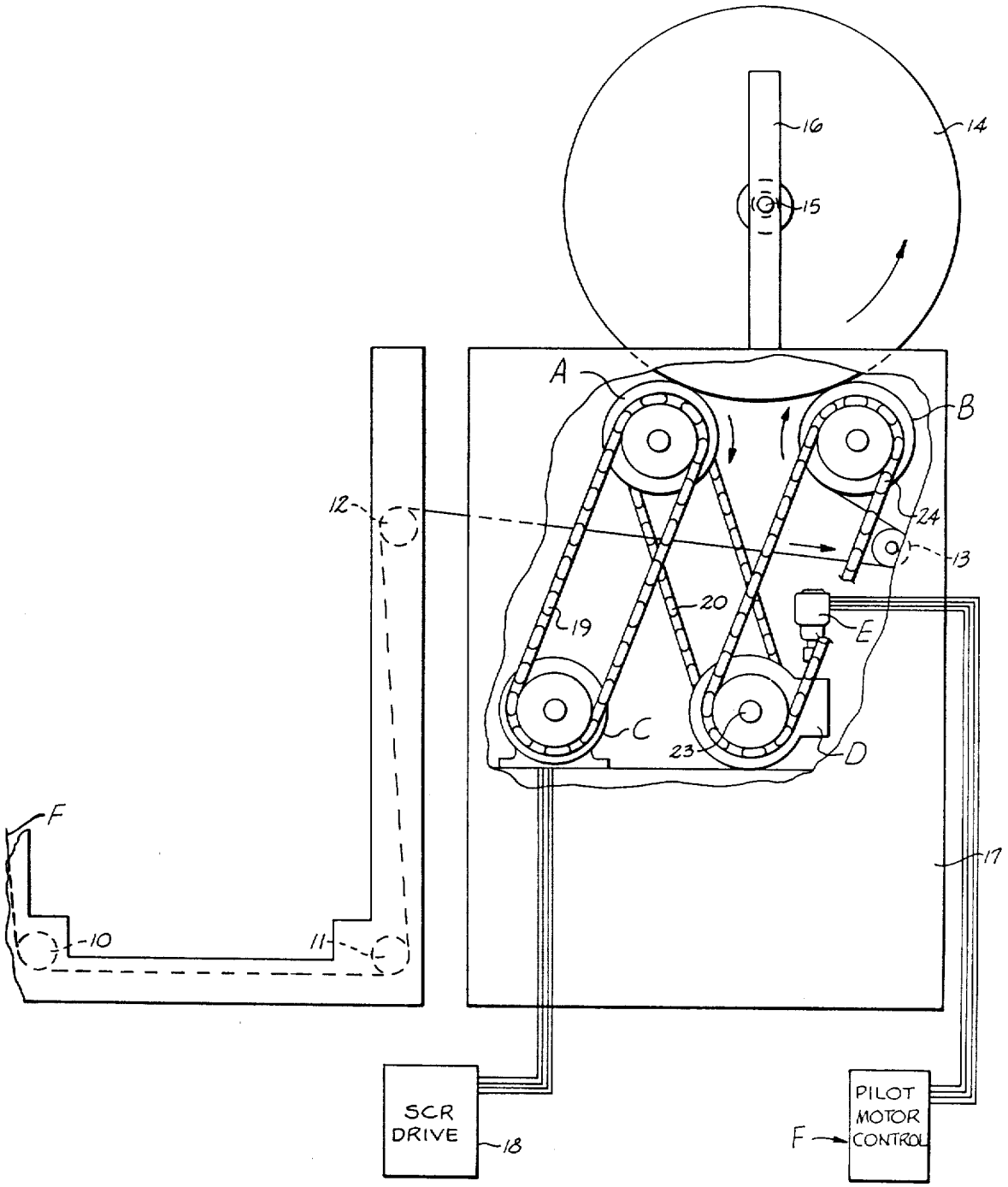
FIG. 1 is a side elevation illustrating a batcher equipped with a tension constructed in accordance with the present invention.
Figure 2:
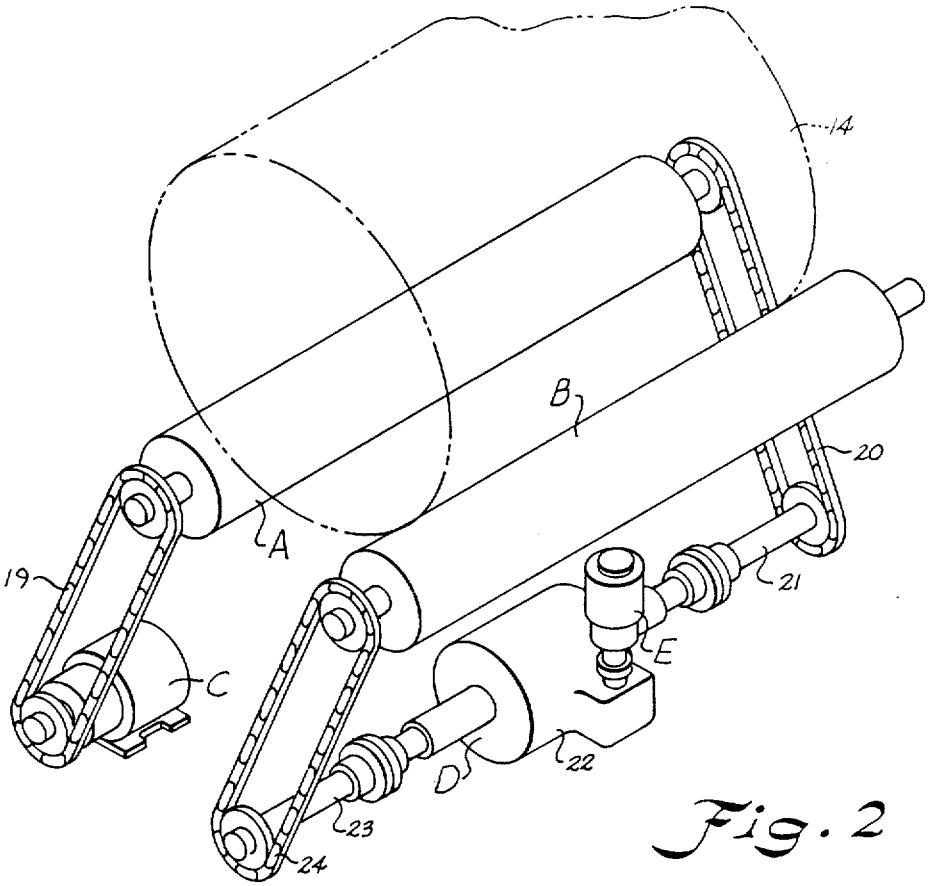
FIG. 2 is a perspective view illustrating the tension control drive.

A cloth handling apparatus is illustrated having a cloth roll carried for surface winding by a pair of aligned driven bed rolls A and B. An electric motor C drives a first roll A of said pair of driven rolls. Power transmission means D is driven by the first roll. A pilot motor E delivers a torque to the power transmission opposite to that of the first roll A. Means F controls the torque delivered by the pilot motor responsive to the tension in the cloth delivered to the cloth roll. The power transmission means drives a second or cloth delivery roll B of the pair of driven rolls. Thus, a differential in speed between the first and second rolls is created wherein the speed of the second roll is slightly less than that of the first roll thus producing packing of the cloth wound by the speed roll upon the cloth roll by retarding passage of the cloth to the cloth roll.

Referring more particularly to the drawings, a web of cloth such as F is illustrated as being delivered to a batcher or the like past guide rolls 10 and 11 and over a suitable guide means 12 to a roll 13 and then fed to the batcher cloth or wound roll 14 over the driven roll B.

The cloth roll which is illustrated as being carried upon a central tube 15 between supports 16 for guiding same vertically during the building motion of the cloth roll. The supports or standards 16 are illustrated as being carried on suitable transversely spaced side frame members 17. It is desirable that the roll B exert a retarding force upon the web F being wound upon the cloth roll so as to produce a packing action resulting in a tightly wound roll.

Heretofore, this operation has been carried out by varying the teeth of the sprockets of chain drive between the rolls A and B so that the roll B turns slightly slower than the roll A. It is desired here, however, not to use such speed control but rather to utilize torque responsive to tension in the cloth being wound upon the roll. Thus, the packing ratio may be constantly varied so that the tension in the fabric will remain constant, thus resulting in a better building action and firmer package for the cloth roll.

The drawings illustrate controls for the electric motor C in the form of a variable speed drive such as an SCR drive 18 which drives a chain drive 19 connected to the roll A. The roll A through a suitable chain drive 20 drives the power transmission means D. The power transmission means includes an input shaft 21, a phase shifting differential transmission 22 as well as an output shaft 23 which drives a suitable chain drive 24 so that the roll B is driven at a differential speed so as to establish a packing ratio to result in a tighter and better cloth roll 14. A phase shifting differential transmission found to be satisfactory is designated PDS and supplied by Fairchild-Hiller Industries of Winston-Salem, N.C. Any suitable speed reducer may perform the function of the phase shifting differential transmission.

Figure 3:
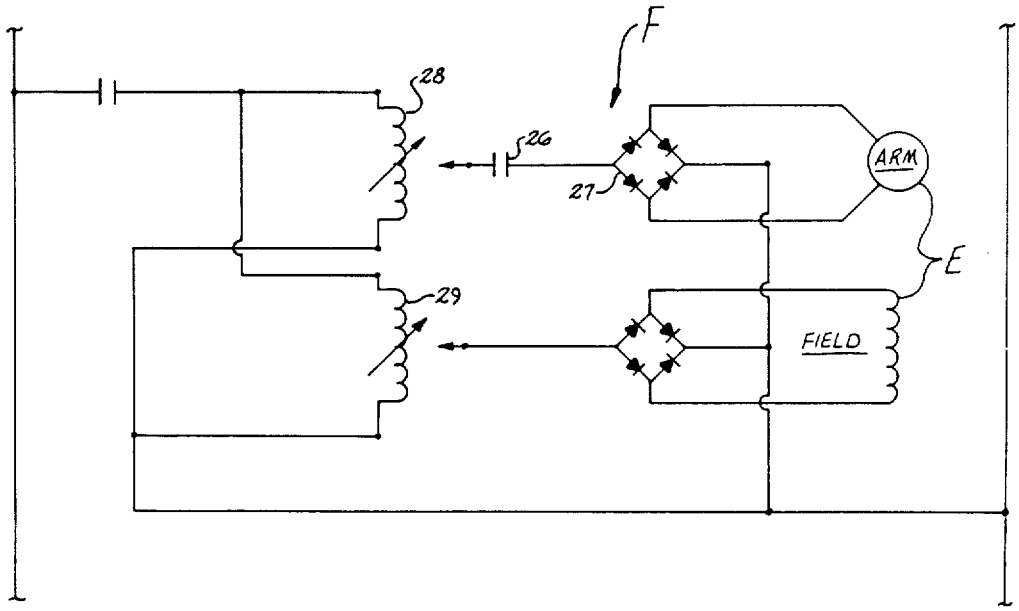
FIG. 3 is a schematic diagram of the electrical components for the tension control.

The phase shifting differential transmission is controlled by a pilot motor E which in turn is operated responsive to cloth tension having a pilot motor control means including a circuit broadly designated at F. The circuit means F is included within a control manufactured by Vee-Arc Corporation of Westboro, Mass. under U.S. Pat. No. 3,221,237 the disclosure of which is incorporated herein by references. Such circuitry is provided for the D.C. motor E which has an armature and field circuit as illustrated schematically in FIG. 3. In series connection with the armature is a condensor 26 and a rectifier 27 as well as an alternating current source through variable transformer 28. The condensor has an impedance sufficient to impart a substantial negative slope to the speed load characteristics of the motor.

Thus, the mechanical input provided by the shaft 21 transfers power to the phase shifting differential transmission 22. The transmission 22 has an output reduced by the reverse torque of the motor E in proportion to the tension in the fabric so that the rotation of the roll B is less than that of the roll A by a predetermined reduction to establish a desirable packing ratio.

It is thus seen where, as formerly, speed control is utilized the tension on the fabric varies while the packing ratio remains constant. Here torque control is utilized to tension the fabric so that the tension in the fabric will remain substantially the same. The control operates responsive to the tension in the cloth delivered to the cloth roll. Torque control is through a capacitor 10 of the afore-mentioned U.S. Pat., FIG. 1. (that wound between the bed rolls)

As the voltage on the field is manually reduced the torque is reduced. Thus a light tension with wide variations is produced as might be especially useful for inspection, batchers and the like. Since there is no positive packing differential and since the differential changes, such is especially useful with delicate fabrics. Apparatus constructed in accordance with the invention possesses a further important advantage in that the second bed rolls does not tend to break tension with the fabric.

While a preferred embodiment of the invention has been described using specific terms, such description is for illustrative purposes only and it is to be understood that changes and variations may be made without departing from the spirit or scope of the following claims.

What is claimed is:

1. A web handling apparatus having a wound roll carried for surface winding by a pair of aligned driven rolls having a variable speed differential between them comprising:

an electric motor driving a first roll of said pair of driven rolls;

mechanical power transmission means driven by said first roll;

a pilot delivering a torque to said power transmission *means* opposite to that of the first roll to reduce the output thereof to control the output of the power transmission *means;* means controlling the torque delivered by said pilot motor responsive to the tension in the web delivered to the wound roll to reduce the output in proportion to such tension; and said power transmission means driving a second roll of said pair of driven rolls;

whereby a differential in speed between the first and second rolls is created wherein the speed of the second roll is slightly less than that of the first roll thus producing packing of the web wound by the second roll upon the wound roll by retarding passage of the web thereto.

2. The structure set forth in claim 1 wherein the power transmission means includes a phase shifting differential transmission.

*3. A web handling apparatus having a wound roll carried for surface winding by a pair of aligned driven rolls having a variable speed differential between them comprising:*

*an electric motor driving a first roll of said pair of driven rolls;*

*mechanical power transmission means including electrically operable means varying the output of the power transmission means responsive to variations in web tension, driven by said first roll;*

*means delivering a torque to said power transmission means to vary the output thereof;*

*means controlling the output of the power transmission means through the electrically operable means; and*

*said power transmission means driving a second roll of said pair of driven rolls;*

*whereby a differential in speed between the first and second rolls is created thus producing packing of the web wound upon the wound roll.*

* * * * *